(12) United States Patent
Chen (10) Patent No.: US 11,439,266 B2
(45) Date of Patent: Sep. 13, 2022

(54) AIR-ENERGY COOKER COVER AND MULTIFUNCTIONAL PRESSURE COOKER

(71) Applicant: ZHEJIANG TIANXI KITCHEN APPLIANCE CO., LTD., Lishui (CN)

(72) Inventor: Xiyan Chen, Lishui (CN)

(73) Assignee: ZHEJIANG TIANXI KITCHEN APPLIANCE CO., LTD.

( * ) Notice: Subject to any disclaimer, the term of this patent is extended or adjusted under 35 U.S.C. 154(b) by 289 days.

(21) Appl. No.: 16/579,840

(22) Filed: Sep. 24, 2019

(65) Prior Publication Data
US 2020/0205596 A1 Jul. 2, 2020

(51) Int. Cl.
*A47J 27/08* (2006.01)
*A47J 27/086* (2006.01)

(52) U.S. Cl.
CPC ......... *A47J 27/0802* (2013.01); *A47J 27/086* (2013.01)

(58) Field of Classification Search
CPC .. A47J 27/0802; A47J 27/0817; A47J 27/086; A47J 37/0641
See application file for complete search history.

(56) References Cited

U.S. PATENT DOCUMENTS

| 10,653,270 | B2 * | 5/2020 | Gill | A47J 27/0804 |
| 2017/0245686 | A1 * | 8/2017 | Man | A47J 37/1257 |
| 2018/0192825 | A1 * | 7/2018 | Popeil | A23L 5/11 |
| 2018/0279832 | A1 * | 10/2018 | Ohta | A47J 43/0465 |
| 2020/0170438 | A1 * | 6/2020 | Freymiller | A47J 27/0817 |
| 2021/0038012 | A1 * | 2/2021 | Huang | A47J 37/0641 |

FOREIGN PATENT DOCUMENTS

CN 109106231 A * 1/2019 .......... A47J 37/0629

OTHER PUBLICATIONS

"Li, A multifunctional air frying pan, 2018" (Year: 2018).*

* cited by examiner

*Primary Examiner* — Brian W Jennison
*Assistant Examiner* — Abigail H Rhue (57) ABSTRACT

An air-energy cooker cover and a multifunctional pressure cooker includes a cooker body, and, a cooker cover, wherein the cooker cover is installed on the cooker body, wherein the cooker body comprises a base, wherein the base is sequentially provided with a periphery, an outer pot and an inner pot from outside to inside, wherein a heating plate is arranged between the inner upper surface of the outer pot and the inner pot, wherein handles are symmetrically arranged at the top end of the outer side wall of the periphery, and a shaftless air-guiding wheel is arranged at the bottom of the inner pot, wherein a socket is installed at the top portion of the outer side wall of the periphery, and a control panel is installed on the side wall of the periphery.

4 Claims, 6 Drawing Sheets

AIR-ENERGY COOKER COVER AND MULTIFUNCTIONAL PRESSURE COOKER

TECHNICAL FIELD OF THE INVENTION

The present invention relates to the technical field of manufacturing kitchen appliances, and more particularly, to an air-energy cooker cover and a multifunctional pressure cooker.

BACKGROUND OF THE INVENTION

An air fryer is a kitchen appliance possessing both baking and frying functions, capable of quickly heating and crisping foods. The taste and texture of the deep-fried foods can be achieved without oil. A common electric pressure cooker possesses unique high-temperature and high-pressure functions, achieving short cooking time and low energy consumption. After being cooked under the high pressure of the electric pressure cooker, the texture of the food becomes soft. To satisfy customers' requirements of food variety and better taste, it's necessary to combine and improve the functions of the air fryer and the pressure cooker. Thus, the inventor of the present invention provides an air-energy cooker cover and a multifunctional pressure cooker.

SUMMARY OF THE INVENTION

The purpose of the present invention is to solve the shortcomings in the prior art by providing an air-energy cooker cover and a multifunctional pressure cooker.

To achieve the above purpose, the present invention adopts the following technical solution:

An air-energy cooker cover and a multifunctional pressure cooker comprising a cooker body and a cooker cover, wherein the cooker cover is installed on the cooker body; the cooker body comprises a base; the base is sequentially provided with a periphery, an outer pot and an inner pot from outside to inside; a heating plate is arranged between the inner upper surface of the outer pot and the inner pot. Handles are symmetrically arranged at the top end of the outer side wall of the periphery, and a shaftless air-guiding wheel is arranged at the bottom of the inner pot; a socket is installed at the top portion of the outer side wall of the periphery, and a control panel is installed on the side wall of the periphery;

The cooker cover comprises an upper cover, and a heat insulation cover is arranged in the upper cover; a heating tube cover is arranged at the lower portion of the inner chamber of the heat insulation cover, and a heating tube is installed on the heating tube cover; a motor is installed at the inner upper portion of the upper cover, and the output end of the motor is connected with a blade mounting shaft; the blade mounting shaft penetrates through the heat insulation cover and the heating tube cover in sequence; cold wind fan blades are installed on the blade mounting shaft, and are located above the heating tube cover; hot wind fan blades are installed on the blade mounting shaft, and are located underneath the heating tube; the upper cover is provided with an air passage baffle, and the left portion of the upper surface of the upper cover is provided with a transparent window; an illuminating lamp assembly is installed on the heat insulation cover, and a control box is arranged in the middle of the upper surface of the upper cover.

In another preferred embodiment, a cooker cover body is arranged in the upper cover through a middle ring, and a sealing ring is arranged in the cooker cover body through a fixing support. An uncovering handle is arranged in the middle of the upper surface of the cooker cover body, and an uncovering knob is arranged in the middle of the upper surface of the upper cover. An exhaust valve and a pressure limiting valve are respectively arranged on the left portion of the upper surface of the upper cover.

In another preferred embodiment, a condensate water recovery tank is arranged in the base.

In another preferred embodiment, the shaftless air-guiding wheel comprises a magnetic control member, and air-guiding fan blades are installed on the magnetic control member.

In another preferred embodiment, a frying basket is arranged inside the inner pot, and air-guiding grooves are uniformly formed in the side wall of the frying basket. A frying basket handle is connected to the outer side wall of the frying basket through bolts.

Compared with the prior art, the present invention has the following advantages:

The cooker cover and the cooker body form the main structure of the present invention. The cooker body comprises a base, a periphery, an outer pot and an inner pot. The air-fryer-type cover mainly comprises an upper cover, a heat insulation cover and a heating tube cover. The cold wind fan blades are used for promoting the air circulation, and facilitating the heat dissipation at the upper portion of the heat insulating cover, thereby ensuring a stable operation of the motor. The hot wind fan blades are used for promoting the air circulation in the cooker body, allowing the heating tube to better generate heat. The heat insulation cover can prevent the heat from dissipating so that more energy can be saved. The air in the inner pot can be heated through the heating plate and the heating tube that are arranged on the upper and lower sides. Moreover, with the assistance of the shaftless air-guiding wheel, the inner pot can be heated in an omnidirectional mode so that the function of an air fryer can be achieved. According to the present invention, the food can be quickly heated and crisped so that the delicious, crispy and low-oil food can be obtained. The pressure-cooker type cover mainly comprises a cooker cover body and an upper cover. Under the action of the cooker cover body, the sealing ring and the upper cover, water vapor can only stay in the cooker body, forming a high-temperature and high-pressure environment in the cooker body. In this way, the cooking time is shortened, the energy is saved, and the prepared food is delicious and soft. The present invention provides an air-energy cooker cover and a multifunctional pressure cooker. Through matching the cooker body with two different cooker covers, the conversion between the air fryer and the pressure cooker can be achieved, satisfying customers' requirement of food variety and possessing a higher practicability.

101—Base, 102—Periphery, 103—Outer Pot, 104—Inner Pot, 105—Heating Plate, 106—Hanle, 107—Shaftless Air-guiding Wheel, 1071—Magentic Control Member, 1072—Air-guiding Fan Blades, 108—Socket, 109—Control Panel, 201—Upper Cover, 202—Heat Insulation Cover, 203—Heating Tube Cover, 204—Heating Tube, 205—Motor, 206—Cold Wind Fan Blades, 207—Hot Wind Fan Blades, 208—Air Passage Baffle, 209—Transparent Window, 210—Illuminating Lamp Assembly, 211—Control Box, 3—Middle Ring, 4—Cooker Cover Body, 5—Fixing Support, 6—Sealing Ring, 7—Uncovering Handle, 8—Uncovering Knob, 9—Exhaust Valve, 10—Pressure Limiting Valve, 11—Condensate Water Recovery Tank, 12—Frying Basket, 13—Air-guiding Groove, 14—Frying Basket Handle.

DETAILED DESCRIPTION OF THE INVENTION

Drawings and detailed embodiments are combined hereinafter to elaborate the technical principles of the present invention. Obviously, the following are merely some embodiments of the present invention and those skilled in the art can associate themselves with other drawings without paying creative labor.

Embodiment 1

An air-energy cooker cover and a multifunctional pressure cooker, as shown in FIGS. 1-5, comprises a cooker body and a cooker cover, wherein the cooker cover is installed on the cooker body. The cooker body and the cooker cover form the main structure of the present invention. The cooker body comprises a base 101 through which the cooker body can be supported and fixed. The base is sequentially provided with a periphery 102, an outer pot 103 and an inner pot 104 from outside to inside. The periphery is used for installing handles, a socket and a control panel. A heating plate 105 is arranged between the inner upper surface of the outer pot and the inner pot. The heating plate 105 arranged between the outer pot and the inner pot can provide heat to the cooker body. Handles 106 are symmetrically arranged at the top end of the outer side wall of the periphery, and a shaftless air-guiding wheel 107 is arranged at the bottom of the inner pot. The socket 108 is installed at the top portion of the outer side wall of the periphery. The pressure cooker of the present invention is connected with an external power supply through the socket and a connecting wire. The socket is electrically connected with the control panel. The control panel 109 is installed on the side wall of the periphery, and the heating plate is controlled through the control panel.

Figure 1:
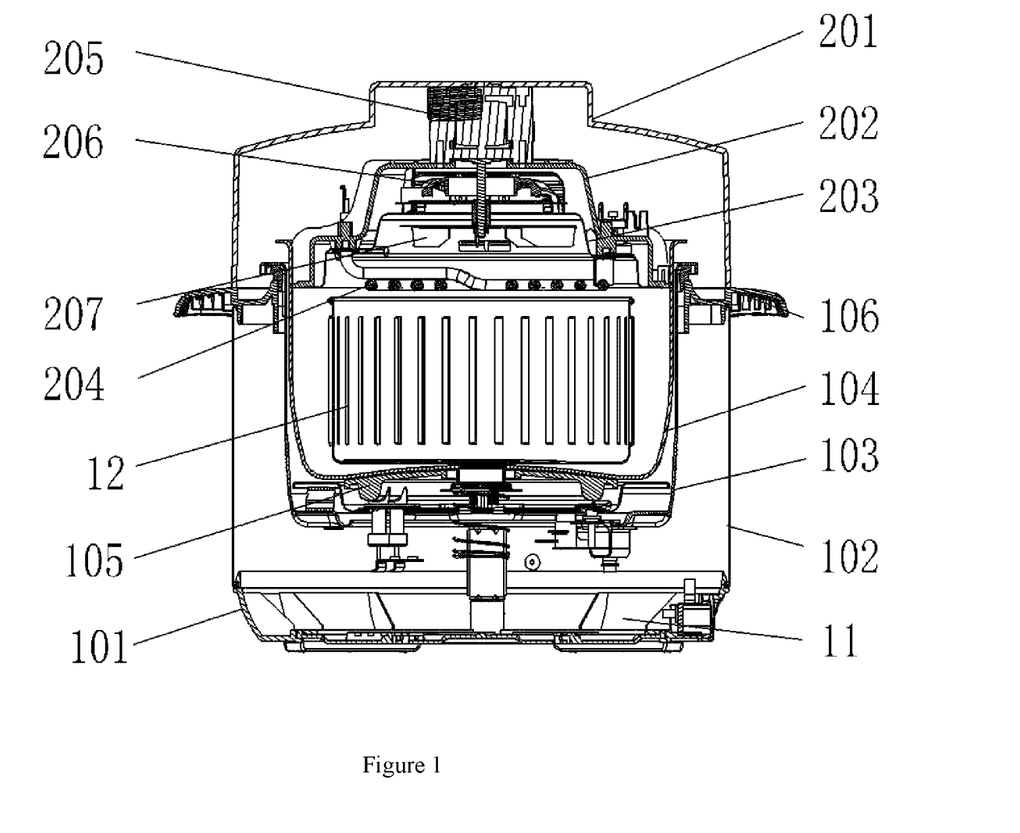
FIG. 1 is a structural diagram of embodiment 1 of the present invention.
Figure 2:
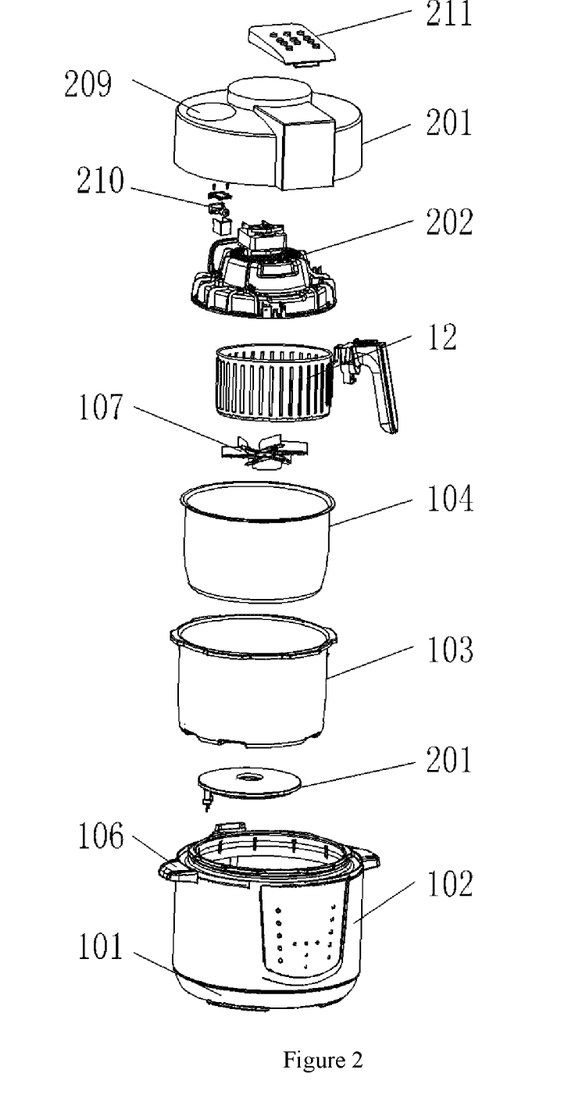
FIG. 2 is an explosive view of embodiment 1 of the present invention.
Figure 3:
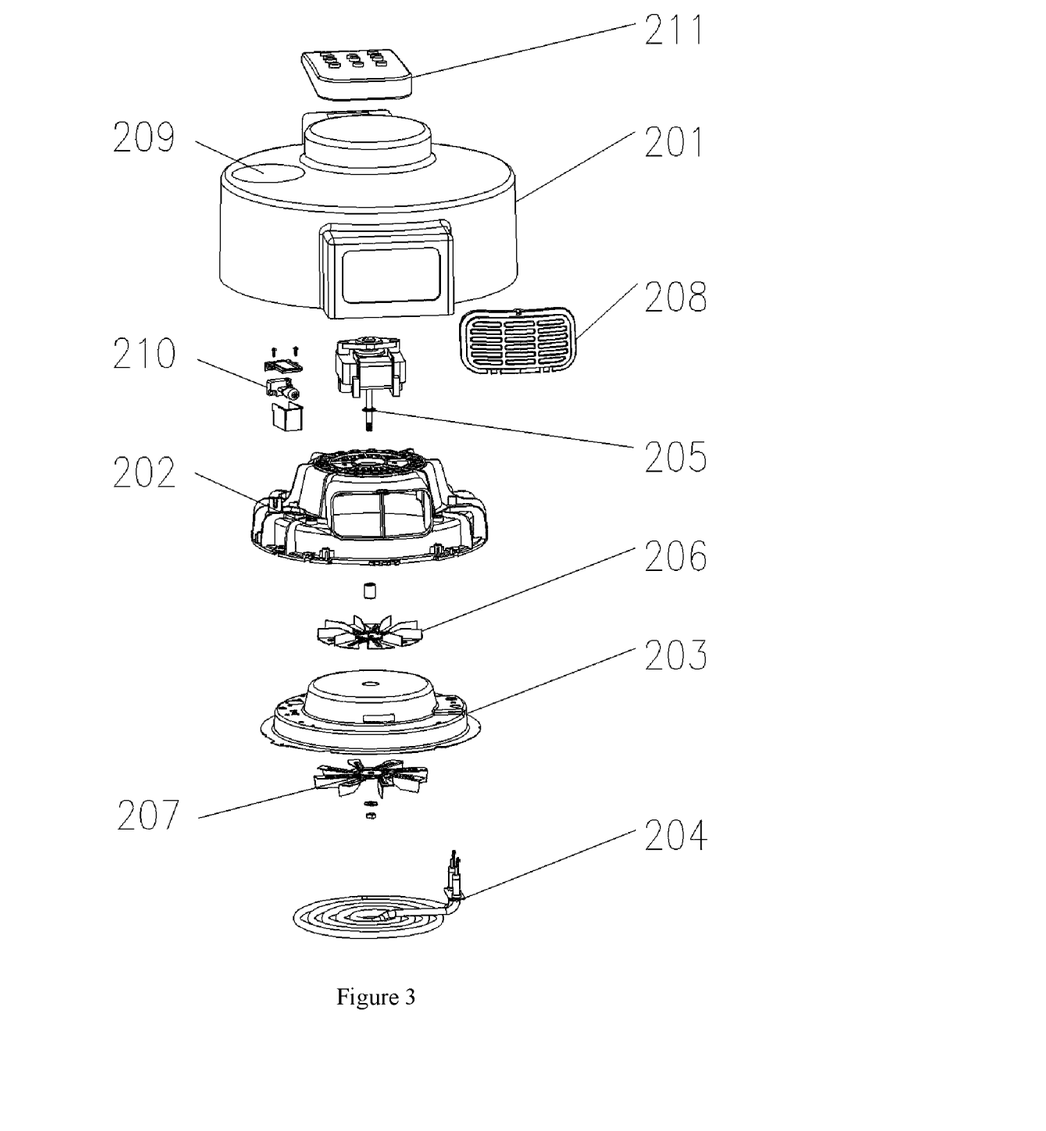
FIG. 3 is an explosive view of the cooker cover of embodiment 1 of the present invention.

The cooker cover comprises an upper cover 201, and a heat insulation cover 202 is arranged in the upper cover. A heating tube cover 203 is arranged at the lower portion of the inner chamber of the heat insulation cover, and a heating tube 204 is installed on the heating tube cover. A motor 205 is installed at the inner upper portion of the upper cover, and the output end of the motor is connected with a blade mounting shaft. The blade mounting shaft penetrates through the heat insulation cover and the heating tube cover in sequence. The air-fryer-type cover mainly comprises an upper cover, a heat insulation cover and a heating tube cover. Cold wind fan blades 206 are installed on the blade mounting shaft, and are located above the heating tube cover. The cold wind fan blades are used for promoting the air circulation, and facilitating the heat dissipation at the upper portion of the heat insulating cover, thereby ensuring a stable operation of the motor. Hot wind fan blades 207 are installed on the blade mounting shaft, and are located underneath the heating tube. The hot wind fan blades are used for promoting the air circulation in the cooker body, allowing the heating tube to better generate heat. The upper cover is provided with an air passage baffle 208, and the left portion of the upper surface of the upper cover is provided with a transparent window 209. An illuminating lamp assembly 201 is installed on the heat insulation cover. A control box 211 is arranged in the middle of the upper surface of the upper cover. After the cooker cover and the cooker body are snap-fitted together, the control box is electrically connected with the socket, and is electrically connected with the motor and the illuminating lamp assembly.

More specifically, a condensate water recovery tank 11 is arranged in the base.

Figure 5:
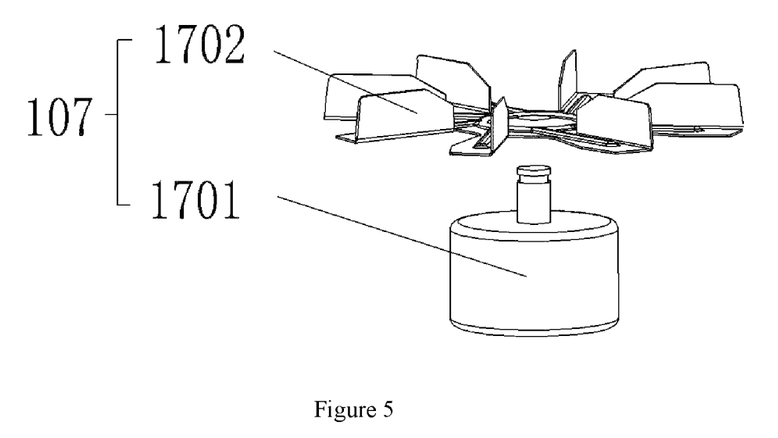
FIG. 5 is a structural diagram of the shaftless air-guiding wheel of the present invention.

More specifically, the shaftless air-guiding wheel further comprises a magnetic control member 1071, and air-guiding fan blades 1072 are installed on the magnetic control member. A driving motor is arranged in the base, and the output end of the driving motor is connected with a magnetic coupler, which is used for controlling the magnetic control member, thereby driving the fan blades to rotate. Its principle is equivalent to that of a magnetic stirrer.

Figure 4:
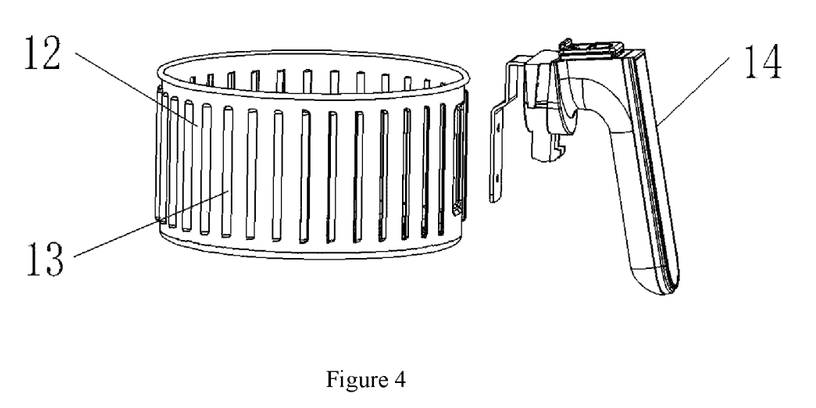
FIG. 4 is a structural diagram of the frying basket, the air-guiding grooves and the frying basket handle of the present invention.

More specifically, a frying basket 12 is arranged inside the inner pot, and air-guiding grooves 13 are uniformly formed in the side wall of the frying basket. A frying basket handle 14 is connected to the outer side wall of the frying basket through bolts, and the frying basket handle is detachable.

The operating principle is the following:

The present invention provides an air-energy cooker cover and a multifunctional pressure cooker, wherein the cooker cover and the cooker body form the main structure of the present invention. The cooker body comprises a base, a periphery, an outer pot and an inner pot. The present invention can be supported and fixed through the base. The periphery is used for installing handles, a socket and a control panel. The operation of the heating plate is controlled through the control panel, and heat can be provided to the cooker body through the heating plate arranged between the outer pot and the inner pot. The inner pot is used for accommodating food materials to be cooked. The cooker cover mainly comprises an upper cover, a heat insulation cover and a heating tube cover. The motor and the heating tube is controlled by the control box to stay in an operating state, wherein the motor drives the cold wind fan blades and the hot wind fan blades to rotate. The cold wind fan blades can promote the heat dissipation at the upper portion of the heat insulation cover, thereby ensuring a stable operation of the motor, and the hot wind fan blades can promote the air circulation in the cooker body, allowing the heat tube to better generate heat. According to the heat insulation cover of the present invention, the heat can be prevented from dissipating so that more energy can be saved. The transparent window and the illuminating lamp assembly allow the user to observe the operating state in the cooker cover. The air in the inner pot can be heated through the heating plate and the heating tube that are arranged on the upper and lower sides. Moreover, with the assistance of the shaftless air-guiding wheel, the inner pot can be heated in an omnidirectional mode so that the function of an air fryer can be achieved. At the same time, when the frying basket is placed into the inner pot, through the air circulation inside and outside the frying basket promoted by the air-guiding grooves, and through the air-frying function of the air fryer, the food can be quickly heated and crisped. Thus, the delicious, crispy and low-oil food can be obtained.

Embodiment 2

Figure 6:
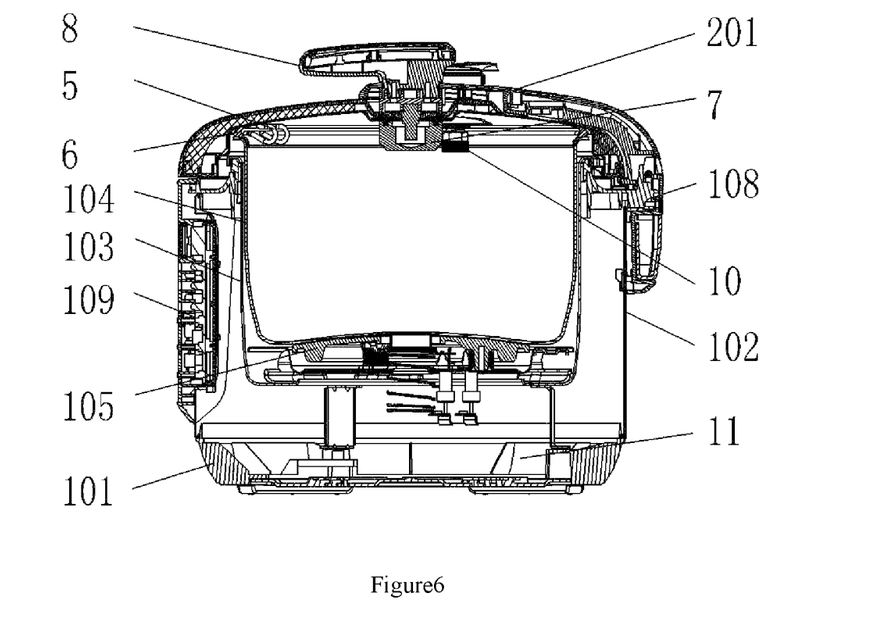
FIG. 6 is a structural diagram of embodiment 2 of the present invention.
Figure 7:
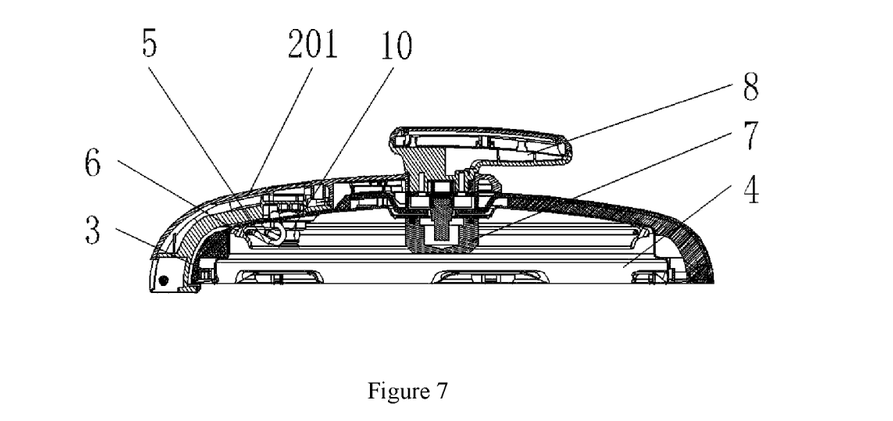
FIG. 7 is a structural diagram of the cooker cover of embodiment 2 of the present invention.
Figure 8:
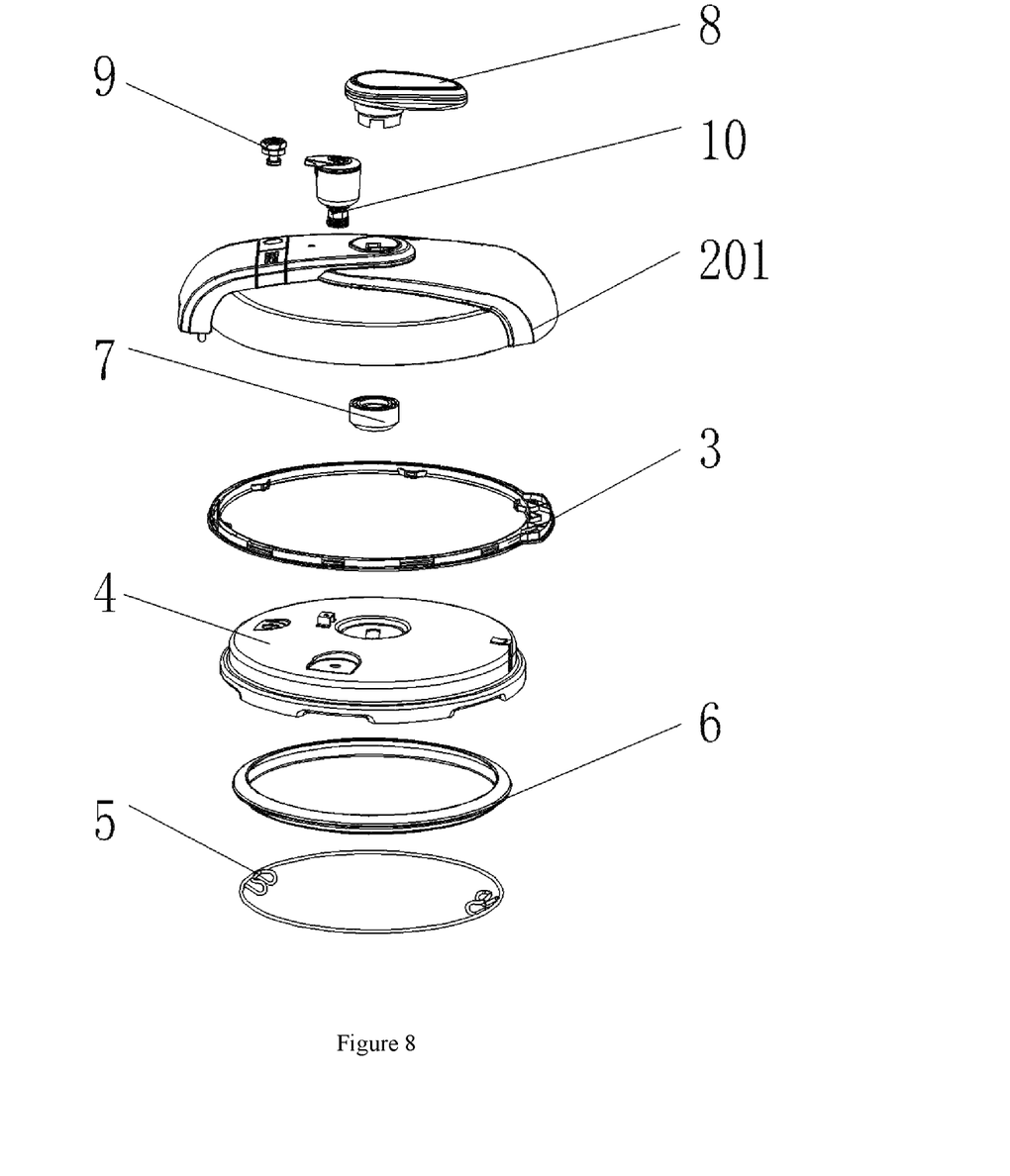
FIG. 8 is an explosive view of the cooker cover of embodiment 2 of the present invention.

An air-energy cooker cover and a multifunctional pressure cooker, as shown in FIGS. 6-8, comprises a cooker body and a cooker cover, wherein the cooker cover is installed on the cooker body. The cooker body comprises a base 101. The base is sequentially provided with a periphery 102, an outer pot 103 and an inner pot 104 from outside to inside. A heating plate 105 is arranged between the inner upper surface of the outer pot and the inner pot. Handles 106 are symmetrically arranged at the top end of the outer side wall of the periphery, and a shaftless air-guiding wheel 107 is arranged at the bottom of the inner pot. A socket 108 is installed at the top portion of the outer side wall of the periphery. A control panel 109 is installed on the side wall of the periphery.

The cooker cover comprises an upper cover. A cooker cover body 4 is arranged in the upper cover through a middle ring 3, and a sealing ring 6 is arranged in the cooker cover body through a fixing support 5. The pressure-cooker type cover mainly comprises a cooker cover body and an upper cover. An uncovering handle 7 is arranged in the middle of the upper surface of the cooker cover body, and an uncovering knob 8 is arranged in the middle of the upper surface of the upper cover. An exhaust valve 9 and a pressure limiting valve 10 are respectively arranged on the left portion of the upper surface of the upper cover More specifically, a condensate water recovery tank 11 is arranged in the base.

The operating principle is the following:

The present invention provides an air-energy cooker cover and a multifunctional pressure cooker. The cooker body and the cooker cover form the main structure of the present invention. The cooker cover mainly comprises a cooker cover body and an upper cover. Through maintaining the air pressure in the cooker body by the pressure limiting valve, the food material in the cooker body is kept in a closed state, and is heated by the heating plate. At this point, under the action of the cooker cover body, the sealing ring and the upper cover, water vapor generated when water in the food material is vaporized under heat can only stay in the cooker body, enabling the air pressure inside the cooker body to be higher than one standard atmospheric pressure. Thus, the water only boils above 100 degrees Celsius, and a high-temperature and high-pressure environment can be formed in the cooker body. In this way, the cooking time is shortened, the energy is saved, and the prepared food is delicious and soft. After the cooking is finished, the steam in the cooker body can be discharged through the exhaust valve, and after the steam is exhausted, the cooker cover can be removed by unscrewing the uncovering knob.

For those skilled in the art, the technical solution described in the embodiments can still be modified, or equivalent replacement can be made on part of the technical features thereof. Any modification, equivalent replacement or improvement made within the spirit and principles of the present invention shall be included in the protective scope of the present invention. The scope of the present invention is defined by the claims and the equivalents.

The invention claimed is:

1. An air-energy cooker cover and a multifunctional pressure cooker, comprising:
    a cooker body, and,
    a cooker cover, wherein the cooker cover is installed on the cooker body, wherein the cooker body comprises a base (101), wherein the base is sequentially provided with a periphery (102), an outer pot (103) and an inner pot (104) from outside to inside, wherein a heating plate (105) is arranged between the inner upper surface of the outer pot and the inner pot, wherein handles (106) are symmetrically arranged at the top end of the outer side wall of the periphery (102), and a shaftless air-guiding wheel (107) is arranged at the bottom of the inner pot (104), wherein a socket (108) is installed at the top portion of the outer side wall of the periphery (102), and a control panel (109) is installed on the side wall of the periphery (102), wherein the cooker cover comprises an upper cover (201), and a heat insulation cover (202) is arranged in the upper cover, wherein a heating tube cover (203) is arranged at the lower portion of the inner chamber of the heat insulation cover (202), and a heating tube (204) is installed on the heating tube cover (203), wherein a motor (205) is installed in a space between the upper cover (201) and the heat insulation cover (202), and the output end of the motor (205) is connected with a blade mounting shaft, wherein cold wind fan blades (206) are installed in a space between the heating tube cover (203) and the heat insulation cover (202), wherein hot wind fan blades (207) are installed in a space between the heating tube and the heating tube cover, wherein the blade mounting shaft penetrates through the heat insulation cover and the heating tube cover to drive both the cold wind fan blades and the hot wind fan blades, wherein the upper cover (201) is provided with an air passage baffle (208), and the left portion of the upper surface of the upper cover (201) is provided with a transparent window (209), wherein an illuminating lamp assembly (210) is installed on the heat insulation cover (202), and a control box (211) is arranged in the middle of the upper surface of the upper cover (201), wherein a condensate water recovery tank (11) is arranged in the base (101) located directly underneath the air-energy cooker, and wherein a driving motor is arranged in the case and the output end of the driving motor is connected with a magnetic coupler, which is used for controlling a magnetic control member, thereby driving the fan blades to rotate.

2. The air-energy cooker cover and a multifunctional pressure cooker of claim 1, wherein a cooker cover body (4) is arranged in the upper cover (201) through a middle ring (3), and a sealing ring (6) is arranged in the cooker cover body through a fixing support (5), wherein an uncovering handle (7) is arranged in the middle of the upper surface of the cooker cover body, and an uncovering knob (8) is arranged in the middle of the upper surface of the upper cover (201), wherein an exhaust valve (9) and a pressure limiting valve (10) are respectively arranged on the left portion of the upper surface of the upper cover (201).

3. The air-energy cooker cover and a multifunctional pressure cooker of claim 1, wherein the shaftless air-guiding wheel (107) comprises the magnetic control member (1071), and air-guiding fan blades (1072) are installed on the magnetic control member.

4. The air-energy cooker cover and a multifunctional pressure cooker of claim 1, wherein a frying basket 12 is arranged inside the inner pot 104, and air-guiding grooves 13 are uniformly formed in the side wall of the frying basket, wherein a frying basket handle 14 is connected to the outer side wall of the frying basket through bolts.

\* \* \* \* \*